R. B. KELSO.
DINNER PAIL.
APPLICATION FILED DEC. 17, 1918.
1,346,034.
Patented July 6, 1920.
2 SHEETS—SHEET 1.
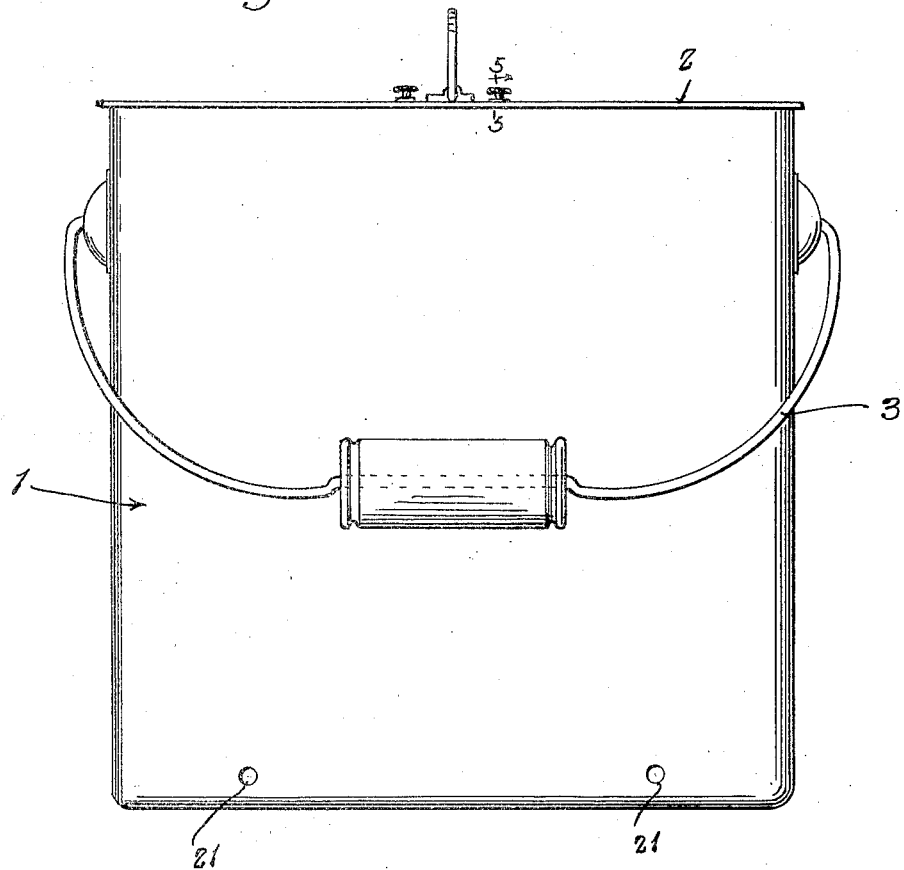
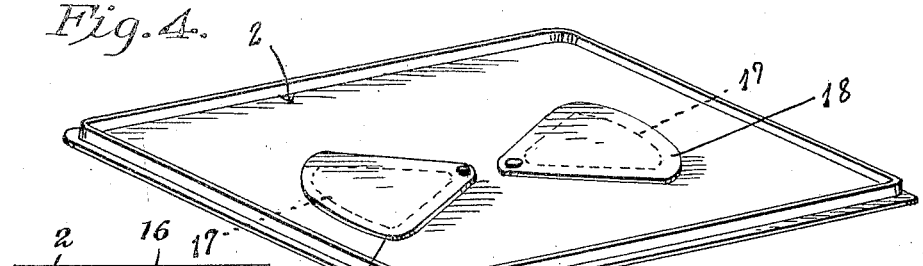
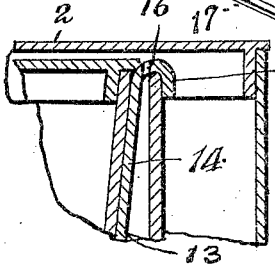
Inventor,
R. B. Kelso.
By (signature), Attorney.

R. B. KELSO.
DINNER PAIL.
APPLICATION FILED DEC. 17, 1918.
1,346,034.
Patented July 6, 1920.
2 SHEETS—SHEET 2.
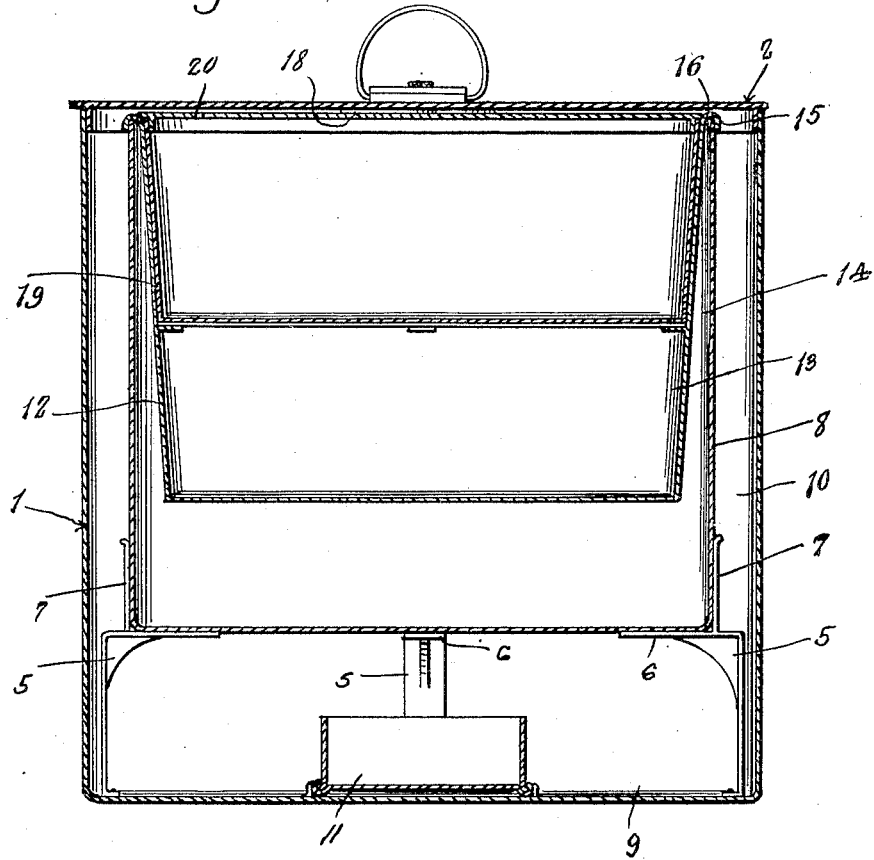
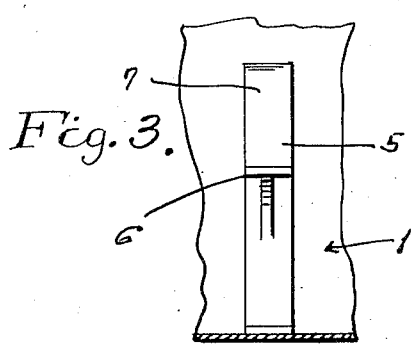
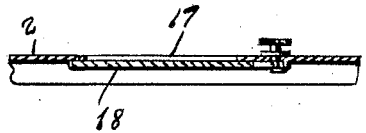
Inventor.
R. B. Kelso

UNITED STATES PATENT OFFICE.

ROBERT B. KELSO, OF SEATTLE, WASHINGTON.

DINNER-PAIL.

1,346,034.  Specification of Letters Patent.  Patented July 6, 1920.

Application filed December 17, 1918. Serial No. 267,200.

*To all whom it may concern:*

Be it known that I, ROBERT B. KELSO, a citizen of the United States, residing at Seattle, in the county of King and State of Washington, have invented certain new and useful Improvements in Dinner-Pails; and I do hereby declare the following to be a full, clear, and exact description of the invention, such as will enable others skilled in the art to which it appertains to make and use the same.

This invention relates to improvements in dinner pails and has for one of its objects the provision of means, whereby different foods can be kept separated and also whereby the foods can be heated so as to obviate workmen and the like having to eat cold food while away from home or at work.

Another object of this invention is the provision of means, whereby the foods can be heated by steam so as to prevent the foods from being dried while being cooked or heated.

A further object of this invention is the provision of a dinner pail of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a side elevation of a dinner pail constructed in accordance with my invention, Fig. 2 is a vertical sectional view of the same, Fig. 3 is a transverse sectional view illustrating the means of supporting the inner receptacle, Fig. 4 is a perspective view of the under side of the cover for the outer receptacle, Fig. 5 is a transverse sectional view taken on the line 5—5 of Fig. 1.

Fig. 6 is a fragmentary sectional view illustrating the steam escape openings.

Referring in detail to the drawings, the numeral 1 indicates a receptacle having a removable cover 2 and a bail 3, whereby the device can be easily carried. Brackets 5 are secured in the receptacle 1 and have their horizontal portions 6 arranged in spaced relation to the bottom of said receptacle and have formed on their portions 6 an annular collar or member 7 adapted to retain an inner receptacle 8 thereon and which is supported in spaced relation of the receptacle 1 to form a fire box 9 in the bottom of said receptacle 1 and also a heat chamber 10. A fire source 11 is placed on the bottom of the receptacle 1 and the heat therefrom is adapted to pass upwardly about the inner receptacle 8 so as to heat the liquid placed therein, which may be either tea, coffee or water.

A supporting receptacle 12 is placed in the inner receptacle 8 and has its bottom wall arranged in spaced relation to the bottom wall of the inner receptacle so as to form a liquid chamber 13 and has its side wall diverging and arranged in spaced relation to the side wall of the inner receptacle to provide a steam chamber 14, which steam is formed by the heating of the liquid in the liquid chamber. The upper edge of the supporting receptacle is curved outwardly and downwardly to form a supporting flange 15 adapted to rest on the upper edge of the inner receptacle and which flange is provided with openings 16 to permit the steam to escape from the steam chamber. The cover 2 is also provided with openings 17 which permit the steam and heat to escape from the device and said openings 17 may be closed by a slide 18 when not heating the foods within the device.

Trays 19 provided with suitable covers 20 are placed within the supporting receptacle and are adapted to contain different foods and which may be heated by the steam from the liquid in the liquid chamber. The receptacle 1 is provided with draft openings 21 near the bottom wall thereof so as to permit a draft to the fire within the fire box.

The entire device is constructed from aluminum or other light metal suitable for the purpose, so that the device can be easily handled and carried and also be cheaply manufactured and sold at a low cost. It is also to be noted that the device can be used for a double cooker for home use by placing different foods to be cooked in the trays.

While I have shown and described the preferred embodiment of my invention, it will be understood that minor changes in construction, combination, and arrangement of parts may be made without departing from the spirit and scope of the invention as claimed.

Having thus described my invention, what I claim is:

A dinner pail comprising an outer receptacle, brackets secured in said receptacle and having horizontal portions arranged in spaced relation to the bottom of said receptacle, an annular collar formed on the horizontal portions, an inner receptacle supported by said portions within the collar, trays supported within the inner receptacle, and covers for said trays and outer receptacle.

In testimony whereof I affix my signature in presence of two witnesses.

ROBERT B. KELSO.

Witnesses:
 DAVID M. MCQUESTEN,
 ARCHIE D. BUTLER.